United States Patent [19]

Shinozaki

[11] 3,761,175

[45] Sept. 25, 1973

[54] LIGHT EXPOSURE MEANS FOR COPYING MACHINES

[75] Inventor: Akira Shinozaki, Kitatama-gun, Tokyo, Japan

[73] Assignee: Konishiroku Photo Industry Co., Ltd., Tokyo, Japan

[22] Filed: Oct. 10, 1972

[21] Appl. No.: 296,170

Related U.S. Application Data

[63] Continuation of Ser. No. 144,721, May 19, 1971, abandoned.

[52] U.S. Cl. .................................................. 355/65
[51] Int. Cl. ........................................... G03b 27/76
[58] Field of Search ................................ 355/64, 65

[56] References Cited
UNITED STATES PATENTS
3,124,996    3/1964    Pfaff ..................................... 355/65

Primary Examiner—John M. Horan
Attorney—Waters et al.

[57] ABSTRACT

The new structure of a light exposure means for copying machine has been proposed. The said light exposure means is characterized by an improvement that in a light exposure means for copying machines wherein a focussing lens is located at an intermediate position of the optical path of the projecting optical system, the first diaphragm plate connected with the diaphragm operation mechanism is mounted near the focussing lens and also the second diaphragm plate is mounted near the image position of the projecting optical system. The new device enables us to make a copying machine in compact and simple form.

4 Claims, 2 Drawing Figures

PATENTED SEP 25 1973 3,761,175

LIGHT EXPOSURE MEANS FOR COPYING MACHINES

This application is a continuation application of Ser. No. 144,721, filed May 19, 1971, now abandoned.

In photographic copying, the light exposure amount to be imparted to a light-sensitive paper should be adjusted depending on the sensitivity of said paper and the density of the image of an original.

In general, there are two copying systems; one is the contact copying system in which an original is put in close contact with a light-sensitive paper to effect light exposure, and the other the project copying system in which the image of an original is projected on the light-sensitive surface of the paper through an optical system to effect light exposure. In the copying machine employing the latter system, the light exposure amount is normally adjusted by means of a diaphragm plate.

The present invention relates to a light exposure means for such project copying system, and has for its object to provide a light exposure means having a novel diaphragm means.

Figure 1:
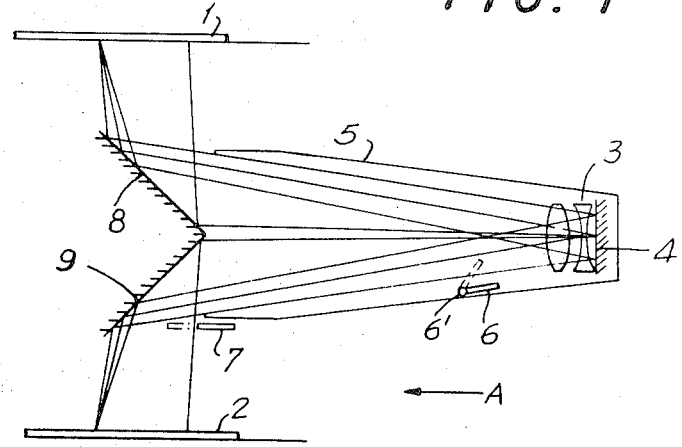
Figure 2:
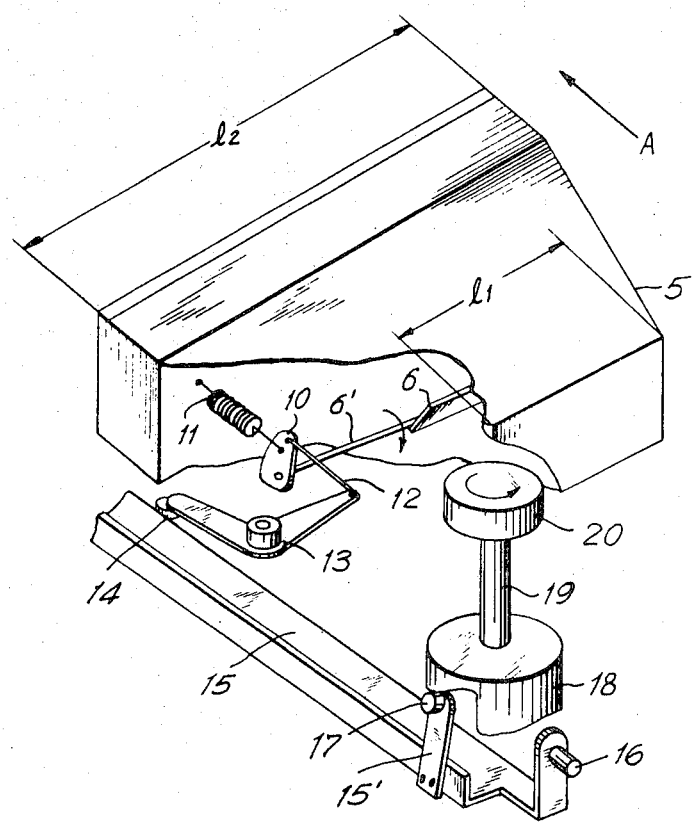

The invention will now be described by light exposure of example to reference to the accompanying drawings in which:

FIG. 1 shows one embodiment of the light exposure means according to the present invention, and FIG. 2 shows the operation mechanism of the first diaphragm plate.

Referring to the drawings, and more particularly to FIG. 1, and light exposure means includes an optical system comprising parts designated by reference numerals 3 to 9. Reference numeral 1 denotes an original, 2 a light-sensitive paper, 3 an in-mirror lens having a reflective surface 4 on one side thereof and 5 a support frame for the optical system. Reference character 6 denotes a first diaphragm plate which is mounted on the support frame 5 so as to turn around the shaft 6', the diaphragm plate being capable of turning to the position indicated by broken line by manipulation from the outside of the support frame 5. Reference character 7 denotes a second diaphragm plate which is mounted on the support frame 5 so that is can move to the position indicated by broken line, and 8, 9 mirrors.

When the quality of copied image changes due to density of the image of an original and that of developer used, the first diaphragm plate 6 is adjusted to correct the quality of the image, and can be manipulated as required when the copying machine is put in use. The operation mechanism of the first diaphragm plate 6 is shown in FIG. 2. in FIG. 2, reference numeral 10 denotes a driving arm rotatable together with the rotary shaft 6' of the second diaphragm plate 6 and which is mounted on the support frame 5.

The driving arm 10 is biased in anticlockwise direction by means of a spring 11 having one end thereof connected with the support frame 5. Reference numeral 13 denotes a crank rotatably mounted on the support frame 5. One end of said crank 13 is connected with the driving arm 10 by means of a connecting cord 12, and the other end of which is provided with an idle roller 14. Reference character 15 denotes a crank rod connected to the body of the copying machine so as to swing about the shaft 16. A lug 15' is fixedly secured to the right side end of the crank rod 15, and the lug 15' is provided with an idle roller 17. Reference character 20 denotes a diaphragm adjusting dial mounted on a control panel of the copying machine etc, and which is integrally formed with a cam 18. By the resiliency of the spring 11, the idle roller 14 is urged on the right side edge of the crank rod 15, and the idle roller 17 on the surface of the cam 18.

When the diaphragm adjusting dial 20 is turned in the direction indicated by the arrow mark C, the first diaphragm plate 6 will turn in the direction indicated by the arrow mark B and withdraw from the the path side the projecting optical system thereby to open the first diaphragm plate. the to operate the optical $1_1$ When the support frame 5 is moved in the direction indicated by the arrow mark A and the projecting optical system scans the image of the original to be copied, the idle roller 14 will slide along the right side edge of the crank rod 15, and the first diaphragm plate 6 will move under such condition as it is set by the diaphragm adjusting dial 20. The second diaphragm plate 7 is mounted on the support frame 5 by means of a set screw etc., but can be shifted by loosening said set screw when a light-sensitive paper having a different sensitivity is used. The adjustment of the second diaphragm plate 7 is in principle made by a salesman of the manufacturer of the copying machine, and so it is necessary for the user of the copying machine only to operate the first diaphragm plate. The support frame 5 encasing the projecting optical system is so designed for reason of the optical path of the optical system that the lateral width $l_1$ at the right hand part thereof where the in-mirror lens 3 is located is small and the lateral width $l_2$ at the left hand thereof where the mirrors 8, 9 are located is large, as shown in FIG. 2. In case of small-sized copying machines, the lateral width $l_2$ at the left hand part of the support frame 5 is designed equal to entire width of the copying machine.

In the present invention, is is necessary to provide the diaphragm operation mechanism numbered 10 to 14 on the support frame 5, so that the first diaphragm plate 6 is located near the right hand part of the support frame 5, that is to say; the in-mirror lens 3.

Such arrangement enables us to have a copying machine in compact and simple form, because a diaphragm operation mechanism employed in the present invention is designed in small size.

On the other hand, the second diaphragm plate 7 which does not need to have diaphragm operation mechanism is located near the mirror 9, that is to say; the image position. In this case, the image is projected at the position where a light-sensitive paper is located. Whereas, it can be said that if a light source is located at the position where the light-sensitive paper is placed, an image will be projected at the position where original 1 is placed. Therefore, it is also possible to locate the second diaphragm plate 7 near the mirror 8.

In short, according to the present invention, the first diaphragm plate connected with the diaphragm operation machanism is located near the focussing lens of the projecting optical system and the second diaphragm plate fitted semi-permanently is located near the image position of the projecting optical system, and therefore it is possible to adjust the light amount in a wide range by adjusting both the diaphragm plates. Furthermore, since it is necessary for the user of copying machine only to operate the first diaphragm plate, it is very simple for the user to adjust the light exposure amount. Because of the above features and also because of the fact that the copying machine can be made very compact by building such small sized diaphragm operation mechanism therein, this invention is very useful in practical application.

What is claimed is:

1. A light exposure means for copying machines including a focusing lens located at an intermediate position in the optical path of a projecting optical system, comprising a first diaphragm plate positioned in close proximity to said focusing lens, a diaphragm control mechanism operably connected to said diaphragm plate, said diaphragm plate being positioned closer to the focusing lens than to either an image position and position of an original; and a second diaphragm plate in close proximity to said image position, said second diaphragm plate being positioned closer to the image position than to the focusing lens, said first and second diaphragm plates each being adjustably mounted.

2. A light exposure means for copying machines including a focusing lens located at an intermediate position in the optical path of a projecting optical system, comprising a first diaphragm plate positioned in close proximity to said focusing lens, a diaphragm control mechanism operably connected to said diaphragm plate, said diaphragm plate being positioned closer to the focusing lens than to either of an image position and position of an original; and a second diaphragm plate in close proximity to said image position, said second diaphragm being positioned closer to the position of the original than to the focusing lens, said first and second plates each being adjustably mounted.

3. A light exposure means for copying machines as claimed in claim 1, wherein said second diaphragm plate is in a preset position so as to have light passage therethrough limited.

4. A light exposure means for copying machines as claimed in claim 2, wherein said second diaphragm plate is in a preset position so as to have light passage therethrough limited.

* * * * *